United States Patent [19]

Van Iperen et al.

[11] Patent Number: 4,611,961
[45] Date of Patent: Sep. 16, 1986

[54] WHEEL HARNESS AND A METHOD FOR MOUNTING A WHEEL HARNESS ON A WHEEL

[75] Inventors: Willem H. P. Van Iperen, Westfield, N.J.; Thomas M. Cowhey, Bayside, N.Y.

[73] Assignee: Sea-Land Corporation, Elizabeth, N.J.

[21] Appl. No.: 733,135

[22] Filed: May 10, 1985

[51] Int. Cl.⁴ .......................... B60P 3/07; B65D 63/00
[52] U.S. Cl. .......................................... 410/20; 410/3; 410/21; 410/23; 410/101; 294/157; 248/499
[58] Field of Search ........................... 410/3, 4, 9–13, 410/16, 19, 20, 21, 23, 24, 97; 248/499; 294/74, 149, 157

[56] References Cited

U.S. PATENT DOCUMENTS

| | | | |
|---|---|---|---|
| 2,455,237 | 11/1948 | Davis | 410/97 |
| 3,686,715 | 8/1972 | Brodnicki | 24/68 CD |
| 3,961,585 | 6/1976 | Brewer | 410/97 |
| 4,297,062 | 10/1981 | Sauber | 410/37 |
| 4,343,401 | 8/1982 | Paulyson | 206/577 |
| 4,371,298 | 2/1983 | Van Iperen | 410/25 |
| 4,436,466 | 3/1984 | Marino | 410/118 |
| 4,479,746 | 10/1984 | Huber | 410/21 |

Primary Examiner—Robert B. Reeves
Assistant Examiner—Scott H. Werny
Attorney, Agent, or Firm—Scully, Scott, Murphy & Presser

[57] ABSTRACT

A harness for securing a vehicle wheel to a support structure, and a method for mounting a harness on a wheel. The harness comprises loop, hook and lashing straps having connected first ends, and a pair of cross straps extending between the loop and hook straps. To mount the harness on a wheel, the cross straps are placed on a vertically extending surface thereof, the hook strap is wrapped across that vertically extending surface and along an inside face of the wheel, and the loop strap is wrapped over a top surface thereof and along the inside face of the wheel. The hook strap is slipped through a loop on the loop strap, wrapped around the lashing strap, and connected to the loop strap. The lashing strap is connected to the support structure to secure the harness and the wheel thereto.

20 Claims, 14 Drawing Figures

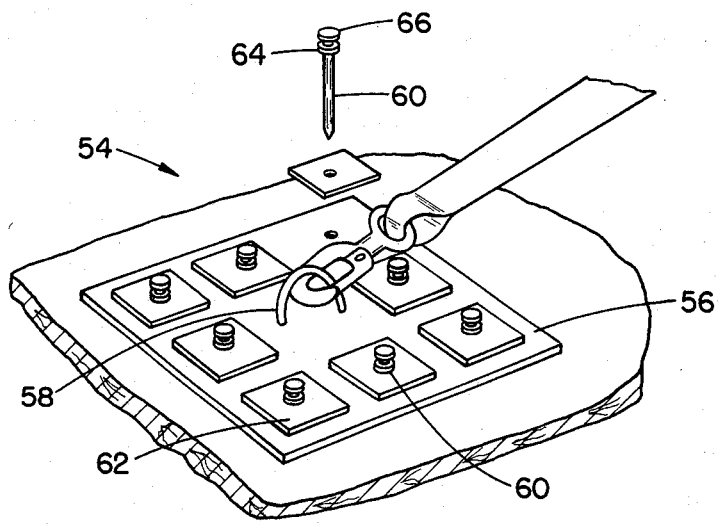
FIG.4
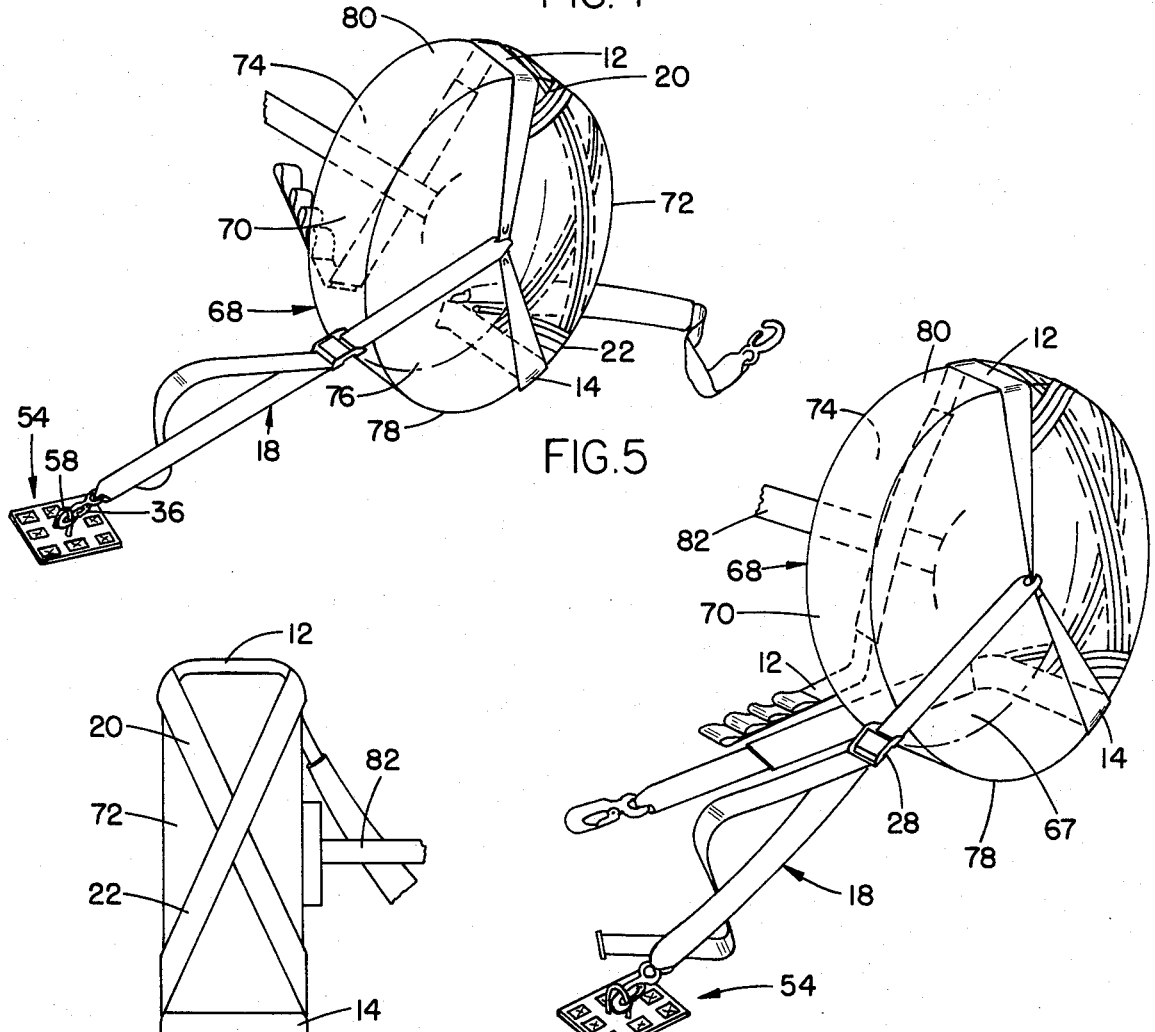
FIG.5
FIG.7
FIG.6

4,611,961

WHEEL HARNESS AND A METHOD FOR MOUNTING A WHEEL HARNESS ON A WHEEL

BACKGROUND OF THE INVENTION

This invention generally relates to means and methods for securing motor vehicles to support structures such as cargo containers, and more specifically, to a wheel harness and a method for mounting a wheel harness on a wheel that may be used for this purpose.

Motor vehicles are occasionally shipped individually or in small groups by truck, railroad or ship, or some combination thereof. For instance, if a person moves from Europe to the west coast of the United States, that person may have a car delivered by ship from Europe to the east coast, transferred to a railroad car, and then carried to the west coast in the railroad car. There are a number of disadvantages associated with the conventional means and methods used to ship small numbers of vehicles.

For example, when carried by ship, the vehicles are normally held in the cargo hold of a freighter, without being stored in any type of crate or container that can be locked and sealed, and it is difficult to prevent theft or pilferage of these open shipments. In addition, often more than one mode of transportation is used to deliver a particular vehicle; and in order to do this with conventional prior art delivery arrangements, the vehicle must be unsecured from one carrier, individually transferred to another carrier, and then resecured to the new carrier. This is difficult and time consuming, and occasionally causes damage to the vehicle.

Standardized cargo containers that can be locked and sealed and that can be handled by and readily transferred between all three above-mentioned modes of transportation have not been utilized to any great extent to ship small numbers of vehicles. In part this is because cargo containers had to be specially manufactured or extensively modified to receive and securely hold motor vehicles, and it is not efficient or economical to provide such containers whenever a small number of vehicles are being shipped.

In addition to the foregoing, prior art arrangements for securing vehicles in or on a carrier commonly employ metal chains or cables to attach the frames of the vehicles directly to the carrier frame. These securing chains or cables are expensive, and they are usually quite heavy, adding to the weight that the carrier vehicle must transport. Further, these conventional securing devices may cause damage to the transported vehicle, either while being installed, because of improper tensioning of the devices, or because of stresses resulting from shifting of the vehicles in transit. Moreover, the conventional securing devices are often difficult and time consuming to attach and may not be easily adaptable to vehicles of different sizes.

U.S Pat. No. 4,479,746 shows a lightweight wheel harness which is mounted on the wheel of a vehicle and secured to a container floor to secure the vehicle thereto. This harness does not require any metal chains or cables to attach the harness to the vehicle wheel, and the harness may be used with cargo containers that can be carried by truck, railroad or ship. It has been found, however, that, in use, this wheel harness tends to come off the wheel on which it is mounted as a result of normal vibrations that occur as the vehicle is transported in the cargo container.

SUMMARY OF THE INVENTION

An object of this invention is to secure a motor vehicle inside a conventional cargo container, which can be easily locked and sealed and which can be carried by and readily transferred between ship, railroad and truck, without requiring any significant modification to the container.

Another object of the present invention is to secure a vehicle in a transport cargo container in a simple and inexpensive manner without connecting any metal chains, cables or hooks to the frame or body of the vehicle.

A further object of this invention is to provide a harness for securing a vehicle in a transport cargo container by means of the vehicle wheels, where the harness may be quickly installed and removed, is reuseable, and may be used with different sizes and types of vehicles.

Still another object of the present invention is to provide a wheel harness that is mounted on a vehicle wheel to secure the vehicle to a cargo container and that will not vibrate off the wheel as the vehicle is transported in the container.

These and other objectives are attained with apparatus for securing a tire equipped wheel of a vehicle to a supporting structure such as a supporting surface. The apparatus includes a harness adapted for placement over the vehicle wheel, the harness comprising a plurality of flexible tension members, or straps, which upon placement over a vehicle wheel, engage only the tire of the wheel. The harness includes adjustable tensioning means for securing the harness to the tire of the wheel, and further includes an extending tension member and attachment means for adjustably attaching the extending tension member to the supporting surface to prevent movement of the wheel with respect to the supporting surface.

With a preferred embodiment, the wheel harness of the present invention comprises a loop strap adapted to extend over a top surface and along an inside face of a vehicle wheel, a hook strap adapted to extend across a vertically extending surface of the wheel and along the inside face thereof, and a lashing strap for connecting the loop and hook straps to a support structure. The loop, hook and lashing straps each include first and second ends, and first ends of the loop, hook and lashing straps are connected together to form a strap junction. The loop strap includes at least one loop adjacent the second end thereof for receiving the second end of the hook strap, and that second end of the hook strap includes means to further connect the second end thereof to the second end of the loop strap. The wheel harness further comprises a connecting section extending between and connecting together the loop and hook straps and adapted to lie against the vertically extending surface of the wheel.

This wheel harness is used to secure a vehicle wheel to a support structure by connecting the lashing strap to that support structure, placing the connecting section of the harness on a first vertically extending surface of the wheel, wrapping the hook strap across that vertically extending surface and along an inside face of the wheel, and wrapping the loop strap over the top surface of the wheel and along the inside face thereof. The hook strap is slipped through a loop on the loop strap forming an apex of an angle located at an outer circumference of the wheel, pulled across a second vertically extending surface of the tire, wrapped around the lashing strap, and then connected again to the loop strap securing the apex thus formed to the lashing strap at the wheel's outer circumference.

The wheel harness of this invention is very simple to mount on and to remove from a wheel, may be reused, and may be used with vehicles of different sizes and types. The harness does not require any metal components that must be moved closely adjacent the body of the vehicle, may be mounted on the wheel without scraping or otherwise damaging the car body, and may be used with conventional cargo containers without requiring any major modification thereto. The wheel harness, when mounted properly, will not vibrate off the wheel, even when subjected to heavy vibrations over an extended period of time. In addition, the wheel harness connects the motor vehicle to the cargo container in a manner that permits the vehicle's own suspension system to absorb shocks and vibrations that occur during transportation of the vehicle.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 4 is a perspective view of an anchor that may be used to secure the wheel harness to the floor of the cargo container.

FIG. 5 shows the wheel harness partially mounted on a vehicle wheel.

FIG. 6 illustrates the wheel harness immediately prior to inserting one end of the hook strap through a loop adjacent one end of the loop strap.

FIG. 7 is a front view of the wheel and wheel harness in the position shown in FIG. 6.

DETAILED DESCRIPTION OF THE PREFERRED EMBODIMENTS

Figure 1:
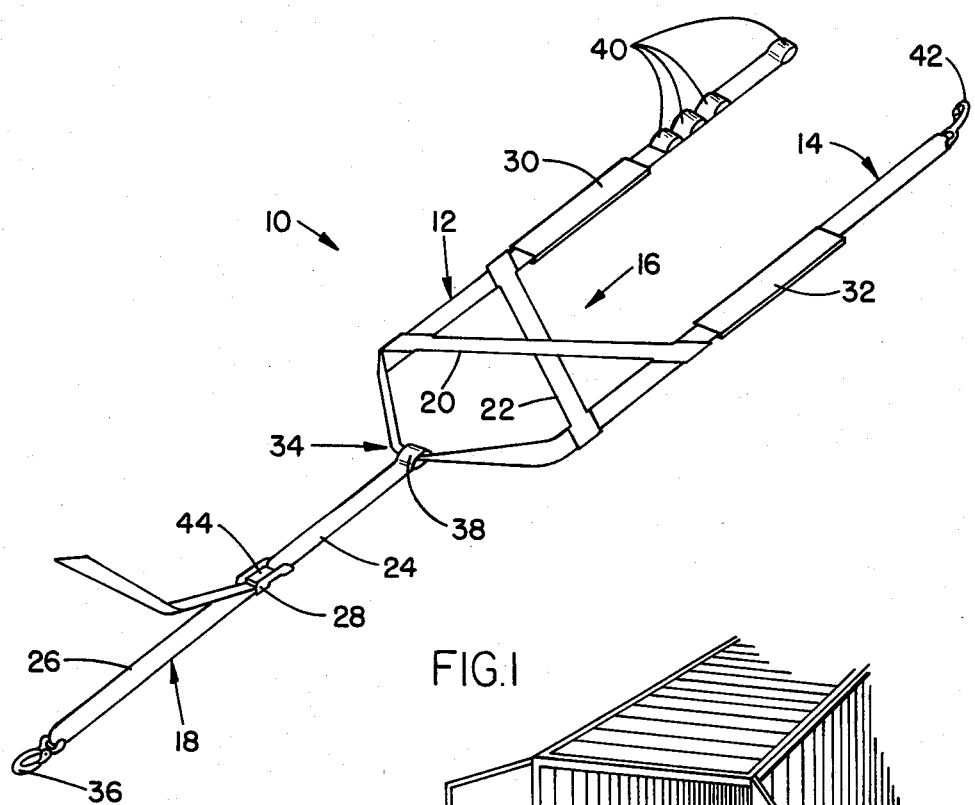
FIG. 1 is perspective view of a wheel harness in accordance with the present invention, showing the harness in a laid out or open position.

FIG. 1 illustrates wheel harness 10 constructed in accordance with the present invention. Generally, harness 10 includes a first hook strap 14, a second loop strap 12, a connecting section 16 and a lashing strap 18. Preferably, connecting section 16 includes first and second cross straps 20 and 22; lashing strap 18 includes fixed-length strap portion 24, adjustable-length strap portion 26, and buckle 28; and wheel harness 10 further comprises sleeves 30 and 32 mounted on intermediate portions of loop and hook straps 12 and 14.

In use, harness 10 engages various outside surfaces of a vehicle wheel, specifically the tire thereof, and connects the wheel to a supporting structure, and the point of connection between the wheel harness and the supporting structure may be forward or rearward of the vehicle wheel.

Loop strap 12 is adapted to extend over a top surface and along an inside face of the vehicle wheel, and hook strap 14 is adapted to extend across a vertically extending surface of the wheel and along the inside face thereof. First and second cross straps 20 and 22, first, extend between and connect together loop and hook straps 12 and 14; second, cross over each other between the hook and loop straps, forming an X-shaped section therebetween; and third, are adapted to lie against the above-mentioned vertically extending surface of the vehicle wheel. Lashing strap 18 is provided for connecting loop and hook straps 12 and 14 to a support structure such as the floor of a cargo container. For this reason, first ends of loop, hook and lashing straps 12, 14 and 18 are all connected together, forming strap junction 34, and a second end of the lashing strap is provided with means such as hook 36 for connecting the lashing strap and, hence, the rest of wheel harness 10 to the support structure.

With the embodiment of wheel harness 10 shown in FIG. 1, the first ends of loop and hook straps 12 and 14 are connected together to form a continuous band, and these ends of the loop and hook straps are connected to the lashing strap 18 by extending this continuous band through loop 38 formed at the first end of the lashing strap. The first ends of loop and hook straps 12 and 14 may be connected together in a variety of ways, such as by sewing, but preferably, these straps are integrally connected together—that is, they are formed from the same piece of material. Sleeves 30 and 32 are mounted on straps 12 and 14, between second ends thereof and cross straps 20 and 22, to protect the intermediate portions of the loop and hook straps from wear during use of wheel harness 10.

In use, second ends of loop and hook straps 12 and 14 are also connected together. For this purpose, loop strap 12 is provided with at least one, and preferably a plurality of, loops 40 adjacent the second end of the loop strap, and the second end of hook strap 14 is provided with hook 42. As discussed in greater detail below, in use, the second end of hook strap 14 is slipped through one of the loops 40 on loop strap 12 and then further connected thereto by means of hook 42.

Fixed- and adjustable-length strap portions 24 and 26 of lashing strap 18 are connected together by buckle 28 in a conventional manner. A loop formed at one end of the fixed-length strap portion 24 extends around a first transverse member of buckle 28, connecting that portion of the lashing strap thereto. At the same time, adjustable-length strap portion 26 extends through buckle 28, between a second transverse member and a gripping tongue 44 that is spring biased into a position securely gripping the adjustable-length strap portion between the gripping tongue and the second transverse member of the buckle. Gripping tongue 44 may be moved away from the second transverse member of buckle 28, allowing adjustable-length strap portion 26 to move therepast to increase or decrease the length of that portion of lashing strap 18 between buckle 28 and hook 36 and thereby increase or decrease the length of the lashing strap.

The various strap or strap portions discussed above are formed from lengths of any suitable textile fabric such as polyester which has the necessary weight, strength, and elasticity requirements. Hooks 36 and 42 are secured to these lengths of fabric by loops formed at ends thereof. These loops, as well as loops 38 and 40, may be made by folding over ends of the lengths of fabric forming the straps of wheel harness 10 and then sewing these folded over portions to the underlying fabric or material. Alternately, the loops of wheel harness 10 may be made by sewing separate pieces of material to an underlying fabric base. Of course, the various pieces of material used to form the loops of wheel harness 10 may be connected together in any suitable way—for instance, by riveting or adhesive bonding. Sewing is preferred, however, because it is relatively simple and inexpensive, produces a strong and durable connection, and does not require any metal parts that might scrape or otherwise damage a vehicle during use of harness 10. Likewise, while cross straps 20 and 22 may be connected to loop and hook straps 12 and 14 in any suitable way, sewing is preferred.

Figure 2:
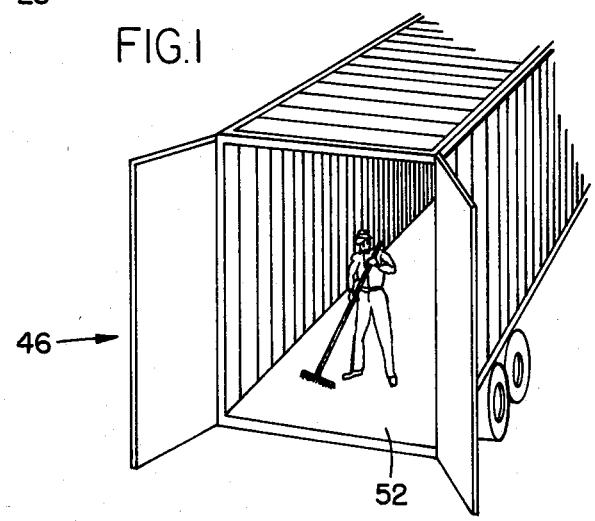
FIG. 2 is a partial perspective view of a cargo container with which the present invention may be used.

Wheel harness 10 may be used for a variety of specific purposes. It is principally designed, though, for securing wheeled vehicles inside enclosed transportable cargo containers of the type shown in FIGS. 2 and 3. Container 46 is prepared for the vehicles 50 by removing all nails and large wood splinters from container floor 52 and providing the container with anchoring means for wheel harness 10. Container 46 may be manufactured or otherwise pre-equipped with such suitable anchoring means. If container 46 is not pre-equipped with anchoring means, specific anchoring means, for example as shown in FIG. 4, may be installed in the container immediately prior to securing a vehicle 50 therein.

Anchoring means 54 illustrated in FIG. 4 includes plate 56 and ring 58. Preferably, anchoring means 54 is nailed to floor 52 of container 46 by a multitude of nails 60 driven through pre-formed holes spaced around plate 56. Flat washers 62 are used to distribute the pressure between nails 60 and plate 56 over a larger surface area. To facilitate removing nails 60, these nails are provided with lower heads 64 that, in use, abut against washers 62, and upper heads 66 that are spaced from the washers and plate 56. Upper heads 66 may be easily engaged by a claw hammer or crowbar to pull nails 60 out of container floor 52. A nailing rod (not shown) known in the art and specifically designed for use with nails of the type shown in FIG. 4 may be used to drive those nails into container floor 52. Of course, other means may be used to connect anchoring means 54 to container floor 52, and in particular, screws may be used in lieu of nails 60 if a more permanent connection is desired.

Figure 3:
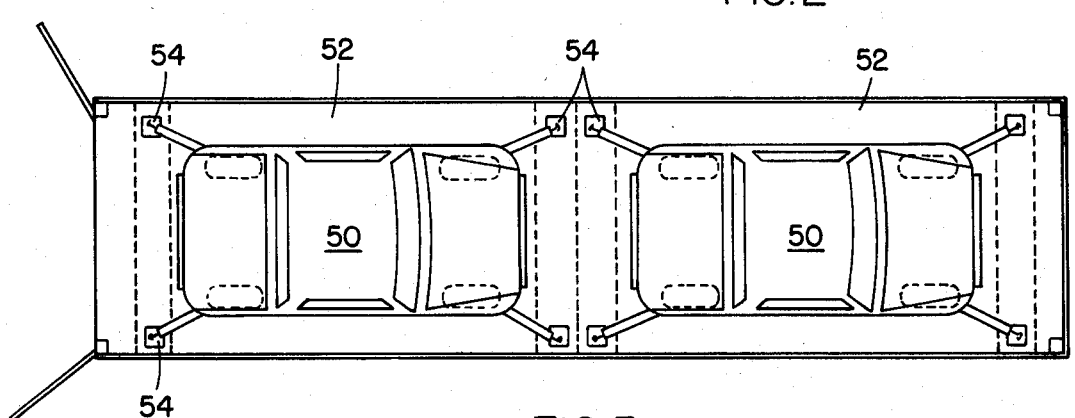
FIG. 3 is a schematic drawing of the floor of the cargo container illustrated in FIG. 2, with two vehicles mounted thereon.

With particular reference to FIG. 3, cargo container 46 is adapted to receive two vehicles 50, and a different set of four anchors 54 is used to secure each vehicle in the container. Each of these sets of anchors is secured to container floor 52 slightly outside the specific area to be occupied by the vehicles and prior to loading those vehicles into the container. Once anchors 54 are installed, a first vehicle 50 is loaded into container 46 and centered between a first set of anchors. Then, each wheel of that vehicle is connected to an adjacent anchor 54 by a separate wheel harness 10.

FIGS. 5 through 12 illustrate a method for mounting harness 10 on a wheel 68 of vehicle 50 and securing that wheel in place in container 46. With this described example, wheel 68 is a rear wheel of vehicle 50, and harness 10 is connected to container floor 52 rearward of wheel 68. Thus, the "rear" surface 70 of wheel 68 is the generally vertically extending, rearwardly facing annular surface thereof, while the "front" surface 72 of the wheel is the generally vertically extending surface that is opposite the rear surface. The "inside" face 74 of the wheel 68 is the generally radially extending surface area thereof that faces toward the longitudinal centerline of the vehicle, and the "outside" face 76 of the wheel is the generally radially extending surface area thereof that faces away from the longitudinal centerline of the vehicle. The "bottom" surface 78 of the wheel 68 is the surface area thereof that directly engages container floor 52, and the "top" surface 80 of the wheel is the generally annular surface opposite from the bottom surface.

With particular reference to FIG. 5, to mount harness 10 on wheel 68, lashing strap 18 is connected to container floor 52 by connecting hook 36 to ring 58 of anchor 54. Next, cross straps 20 and 22 are placed on front surface 72 of the wheel, loop strap 12 is wrapped over top surface 80 of the wheel, and hook strap 14 is wrapped across the front surface of the wheel, as a level below the cross straps.

Hook strap 14 is then extended, as illustrated in FIG. 6, generally horizontally, across inside face 74 of wheel 68, from the front side 72 thereof to backside 70 of the wheel, below the axle 82 on which wheel 68 is mounted. Loop strap 12 is extended laterally, in a generally vertical plane, from top 80 of wheel 68 to bottom 78 thereof, behind axle 82. This intermediate position of wheel harness 10 is also shown in FIG. 7.

Figure 8:
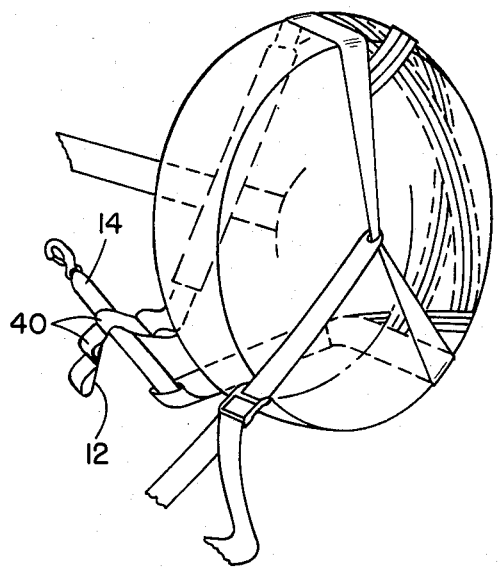
FIG. 8 shows the wheel harness immediately after inserting the hook strap through a loop on the loop strap.

As shown in FIG. 8, the second end of hook strap 14 is inserted through a loop 40 on loop strap 12, specifically the loop closest to rear surface 70 of wheel 68.

Figure 9:
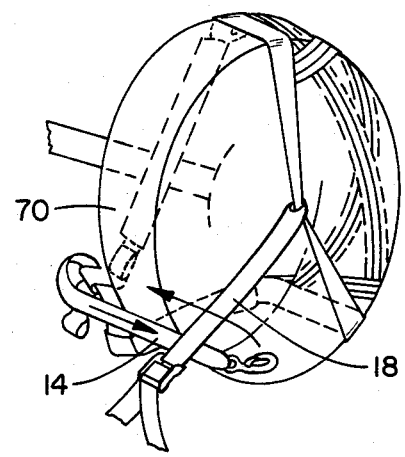
FIG. 9 shows the wheel harness as the hook strap is being wrapped around the lashing strap.

Then, with reference to FIG. 9, hook strap 14 is pulled across rear surface 70 of wheel 68, below the level of axle 82, and wrapped around lashing strap 18, immediately adjacent rear surface 70 of the wheel. The second end of hook strap 14 is then pulled back across rear surface 70 of wheel 68 and connected to the second end of loop strap 12 to form an apex of an angle located at an outer circumference of the wheel, with the second end of the hook strap adapted to secure the apex thus formed to the lashing strap at the wheel's outer circumference.

Figure 10:
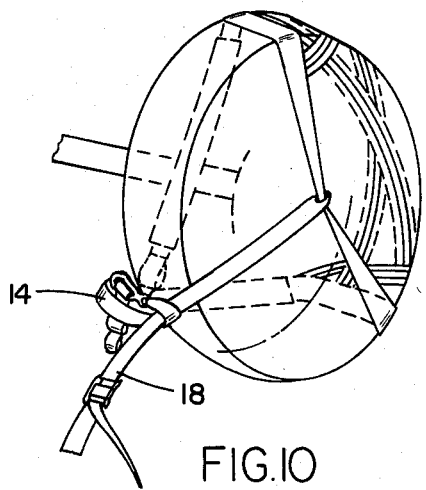
FIG. 10 depicts the wheel harness as the end of the hook strap is connected to the loop on the loop strap.
Figure 11:
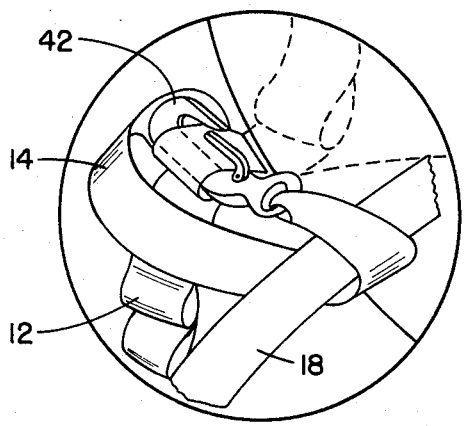
FIG. 11 is an enlarged view of a portion of FIG. 10, illustrating the connection between the end of the hook strap and the loop on the loop strap in greater detail.

As shown in FIGS. 10 and 11, this connection may be made by connecting hook 42 on the hook strap 14 to the same loop on loop strap 12 through which the hook strap had previously been inserted. Preferably, hook strap 14 is extended over and rearward of the loop on loop strap 12 through which the hook strap was inserted so that the webbing of the loop strap is kept entirely forward of the hook strap.

Figure 12:
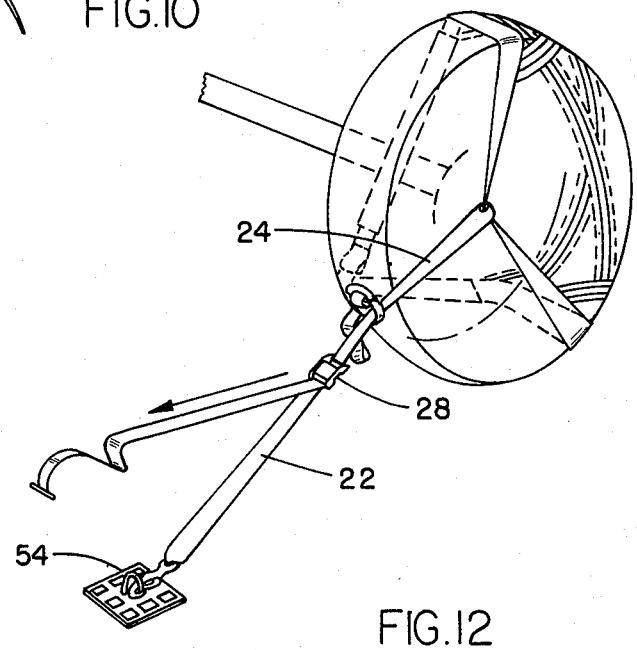
FIG. 12 shows the wheel harness in a final, mounted position.

With harness 10 mounted on wheel 68, the positions of the various straps of the harness are adjusted, first, so that junction 34 of the first ends of loop, hook and lashing straps 12, 14 and 18 is aligned with axle 82 of the wheel, and second, so that hook 42 at the second end of the hook strap rests against a central area of rear surface 70 of the wheel, as depicted in FIG. 12. When this is done, the free end of adjustable-length strap portion 26 of lashing strap 18 is pulled through buckle 28 to tighten wheel harness 10 in place.

Figure 13:
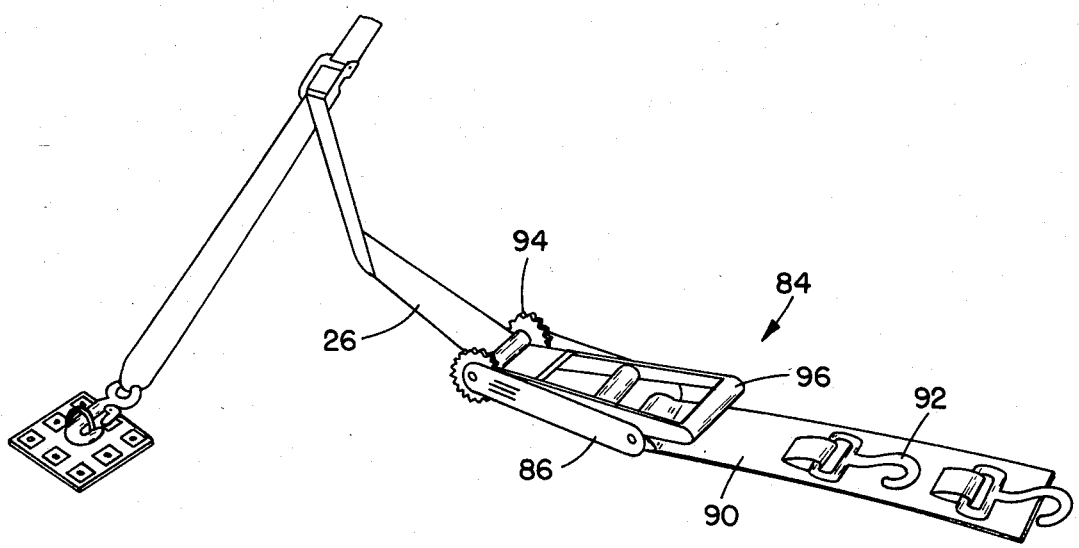
FIG. 13 illustrates a tightening tool that may be used to tighten the wheel harness on the wheel.
Figure 14:
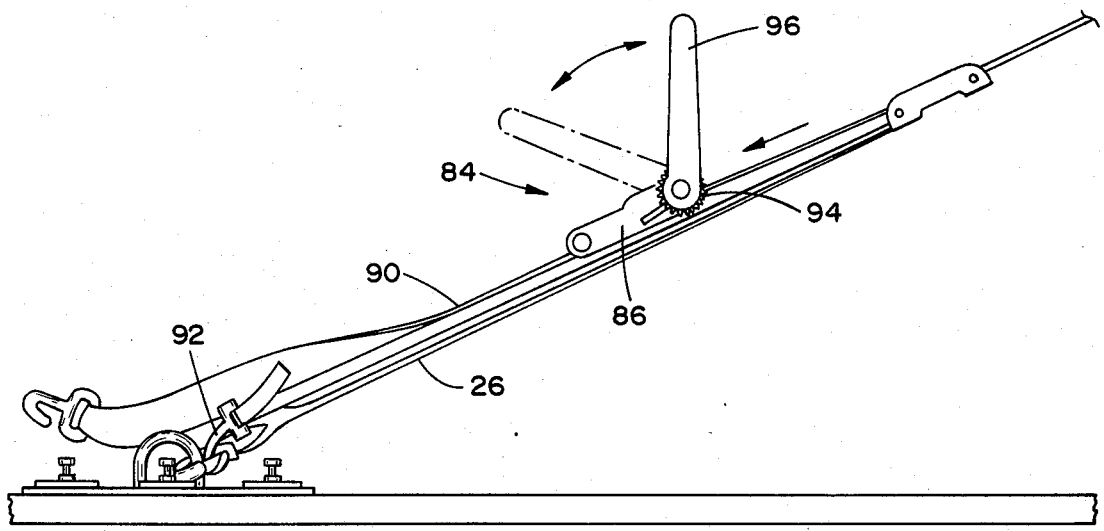
FIG. 14 shows the tightening tool in use.

This may be done by, first, tightening the wheel harness 10 by hand and then using a tool or other device to further tighten the wheel harness on wheel 68. A ratchet tool which may be used to do this is shown in FIGS. 13 and 14. Ratchet tool 84 includes a frame 86, a connecting strap 90 extending from a first longitudinal end of the frame, and one or more hooks 92 secured on the connecting strap. A ratchet drum or spool 94 having a transverse slot extends across and is pivotally supported by a second longitudinal end of ratchet tool frame 86, and a lever or handle 96 is connected to the ratchet drum to rotate that drum relative to the tool frame. To use ratchet tool 84, the first end of adjustable-length portion 26 of lashing strap 18 is fed through ratchet drum 94, a hook 92 of the ratchet tool is connected to hook 36 of lashing strap 18, and lever 96 is used to rotate the ratchet drum and pull the free end of the adjustable-length strap portion tightly through buckle 28. When the desired tension has been achieved, adjustable-length strap portion 26 is released from ratchet drum 94, and ratchet tool 84 is removed.

After a first harness 10 is used to secure a first wheel 68 of vehicle 50 to container floor 52, a second harness is used to connect a second wheel, at the opposite end and side of the vehicle from the first wheel, to the container floor. If as shown in FIG. 3, vehicle 50 has third and fourth wheels, then third and fourth wheel harnesses are used to secure those third and fourth wheels to the container floor.

As will be appreciated by those skilled in the art, wheel harness 10 may be connected to container floor 52 forward of the particular vehicle wheel on which the harness is mounted and indeed this is preferred when the wheel harness is mounted on a front wheel of vehicle 50. When wheel harness 10 is connected to container floor 52 forward of the wheel on which it is mounted, the previously discussed procedure for mounting wheel harness 10 on the vehicle wheel is modified to the extent that references to the front and back surfaces of the wheel are reversed. In particular, cross straps 20 and 22 are placed on the rear surface of the wheel, hook strap 14 is wrapped across the rear surface of the wheel prior to being extended across the inside face of the wheel, and the hook strap is inserted through a loop 40 adjacent the front surface of the wheel and then pulled across that surface and wrapped around the lashing strap 18.

Preferably, cross straps 20 and 22 have a different color than loop and hook straps 12 and 14, or are otherwise plainly visibly distinguishable therefrom, to help observing the position of the cross straps on wheel 68 and determining whether those straps are properly placed thereon. Moreover, it should be noted that connecting section 16 may be formed by means other than cross straps 20 and 22. For example, connecting section 16 may comprise a single strap extending between loop and hook straps 12 and 14. Also, a multitude of thinner straps or strips may extend between loop and hook straps 12 and 14 and cross over each other to form a weave pattern that, in use, makes a basket for holding either the front or rear portion of vehicle wheel 68.

Wheel harness 10 is very easy to install and to remove and may be reused, and the harness permits vehicle 50 to move on its own suspension system, allowing that system to absorb shocks and vibrations that occur during movement of cargo container 46. Also, wheel harness 10 is very effective, and in particular, has been found to remain securely on wheel 68 despite extensive, heavy vibrations of the wheel and vehicle 50. For example, tests have shown that a vehicle secured within a container by four wheel harnesses 10, one mounted on each wheel of the vehicle will readily withstand hump or impact tests of eight miles per hour, exceeding the standards set for cargo restraints by the American Association of Railroads. Experiments have further demonstrated that harness 10 will remain securely on a vehicle wheel even after receiving more than 200,000 shocks during a railroad trip of over 900 miles.

The harness 10 disclosed herein does not require any connection to the under side of vehicle 50 and does not require any metal parts or pieces that are moved or located closely adjacent the body of the vehicle. In addition, the present invention is readily adaptable to vehicles of different sizes, and is well suited for use with conventional cargo containers that can be locked and sealed and carried by ship, truck or railroad. Specifically, this invention does not require any major modification of conventional cargo containers, and any such container that is modified for use with or in the present invention may be easily and quickly restored to its former condition.

While the preferred use for wheel harness 10 is to secure vehicles to the floors of transportable, transferable cargo containers, the present invention may also be used to secure vehicles to other vehicle carrying or supporting structures. For example, harness 10 may be used to secure a vehicle directly to a truck, a railroad car or a ship. Also, it is not necessary that lashing strap 18 be connected to the floor of a cargo container, and the strap may, instead, be secured to a sidewall of a container, or directly to the framework of a carrier vehicle. Furthermore, it should be noted that some or all of the wheels of vehicles with which the present invention is used may be raised off the floor of the surface used to carry or support that vehicle, for example by a supporting ramp of the type shown in U.S. Pat. No. 4,371,298.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. A wheel harness for securing a vehicle wheel to a support structure comprising:
    a loop strap adapted to extend over a top surface and along an inside face of the wheel;
    a hook strap adapted to extend across a vertically extending surface of the wheel and along the inside face thereof;
    a connecting section extending between and connecting together the loop and hook straps, and adapted to lie against the vertically extending surface of the wheel; and
    a lashing strap for connecting the loop and hook straps to the support structure;
    the loop, hook and lashing straps each including first and second ends;
    the first ends of the loop, hook and lashing straps being connected together to form a strap junction;
    the loop strap including at least one means adjacent the second end thereof for receiving the second end of the hook strap to form an apex of an angle located at an outer circumference of the wheel to be secured, with the second end of the hook strap adapted to secure the apex thus formed to the lashing strap at the wheel's outer circumference.

2. A wheel harness according to claim 1 wherein:
the first end of the lashing strap includes a loop;
the first ends of the loop and hook straps are connected together to form a continuous band; and
the continuous band extends through the loop at the first end of the lashing strap.

3. A wheel harness according to claim 2 wherein the first ends of the loop and hook straps are integrally connected together.

4. A wheel harness according to claim 1 wherein the lashing strap includes:
a fixed-length strap portion;
an adjustable-length strap portion; and
a buckle connecting together the fixed-length and adjustable-length portions.

5. A wheel harness according to claim 1 wherein the loop strap includes a plurality of loops adjacent the second end thereof.

6. A wheel harness according to claim 1 wherein the connecting section includes first and second cross straps:
(i) extending between and connecting together the loop and hook straps;
(ii) crossing over each other between the loop and hook straps, and
(iii) adapted to lie against the vertically extending surface of the wheel.

7. A wheel harness according to claim 1 further comprising first and second sleeves mounted on the loop and hook straps respectively, between the connecting section and the second ends of the loop and hook straps.

8. A method for mounting a wheel harness on a vehicle wheel, the harness comprising loop, hook and lashing straps connected together at a common strap junction, and a connecting section extending between and connecting together the hook and loop straps, the vehicle wheel including opposite, first and second vertically extending surfaces, the method comprising the steps of:
locating the common strap junction adjacent an outside face of the wheel;
placing the connecting section on the first vertically extending surface of the wheel;
wrapping the hook strap across the first vertically extending surface of the wheel and along an inside face thereof;
wrapping the loop strap over a top surface of the wheel and along the inside face thereof;
slipping the hook strap through a loop on the loop strap;
pulling the hook strap across the second vertically extending surface of the wheel;
wrapping the hook strap around the lashing strap; and
connecting the hook strap to the loop strap.

9. A method according to claim 8 wherein the step of wrapping the hook strap across the first vertically extending surface of the wheel includes the step of wrapping the hook strap across the first vertically extending surface, below the connecting section.

10. A method according to claim 9 for use with a wheel mounted on an axle, and wherein the step of pulling the hook strap across the second vertically extending surface of the wheel includes the step of pulling the hook strap across the second vertically extending surface, below the level of the axle.

11. A method according to claim 10 wherein the step of wrapping the loop strap over the top surface of the wheel includes the step of extending the loop strap along the inside face of the wheel, on the side of the axle adjacent the second vertically extending surface of the wheel.

12. A method according to claim 11 wherein the step of connecting the hook strap to the loop strap includes the step of hooking the hook strap onto the loop on the loop strap.

13. A method according to claim 12 further comprising the step of aligning the wheel harness on the wheel, the aligning step including the step of aligning the common strap junction with the axle.

14. A method according to claim 13 wherein the loop, hook and lashing straps have connected first ends forming the common strap junction, and wherein:
the step of connecting the hook strap to the loop strap includes the step of connecting a second end of the hook strap to the loop strap; and
the step of aligning the wheel harness on the wheel further includes the step of positioning the second end of the hook strap against a central area of the second vertically extending surface of the wheel.

15. A method according to claim 8 further comprising the step of connecting the lashing strap to a vehicle support structure to secure the wheel thereto.

16. A wheel harness for securing a vehicle wheel to a support structure comprising;
a lashing strap for connecting the wheel harness to the support structure;
a band having a mid portion connected to the lashing strap and further having first and second sections extending therefrom; and
tire engaging means connected to and extending between the first and second sections of the band to engage a surface of the vehicle wheel;
the first section of the band including at least one means adjacent an end thereof for receiving an end of the second section of the band to thereby form an apex of an angle located adjacent an outer circumference of the wheel to be secured, with the second section adapted to secured the apex thus formed to the lashing strap at the wheel's outer circumference.

17. A wheel harness according to claim 16 wherein a first end of the lashing strap forms a loop, and the band extends therethrough to connect the band to the lashing strap.

18. A wheel harness according to claim 17 wherein the tire engaging means includes first and second cross straps extending between the first and second sections of the band, and crossing over each other between said first and second sections.

19. A wheel harness according to claim 18 wherein:
the first section of the band includes a plurality of loops adjacent the end of said first section;
the lashing strap includes an adjustable length portion; and
the means to further connect the second section of the band to said end of the first section of the band includes a hook to connect the second section of the band to a selected one of the loops adjacent the end of the first section.

20. A method for mounting a wheel harness on a vehicle wheel, the harness comprising of first, second and lashing strap connected together at a common strap junction, and a connecting section extending between and connecting together the first and second straps, the vehicle wheel including an axle and first and second opposed circumferential surfaces, the method comprising the steps of:

(a) locating the common strap junction adjacent an outside face of the wheel;

(b) placing the connecting section on the first opposing circumferential surface of the wheel;

(c) wrapping the first strap along an inside vertically extending surface of the wheel below the wheel axle;

(d) wrapping the second strap across the inside vertically extending surface of the wheel above the wheel axle;

(e) securing the first strap to th second strap to form an apex of an angle adjacent the second opposing circumferential surface of said wheel;

(f) wrapping the first strap around the lashing strap to secure the apex thus formed to the lashing strap at the second opposing circumferential surface of the wheel.

* * * * *